C. A. SMITH.
Stock-Car.

No. 226,936. Patented April 27, 1880.

Witnesses
Lyman Rowe
Daniel C Shaw

Inventor
Charles A. Smith
Per J. N. Clouse
Atty

UNITED STATES PATENT OFFICE.

CHARLES A. SMITH, OF TOLEDO, OHIO, ASSIGNOR OF ONE-HALF OF HIS RIGHT TO MYRON D. JONES, OF SAME PLACE.

STOCK-CAR.

SPECIFICATION forming part of Letters Patent No. 226,936, dated April 27, 1880.

Application filed January 29, 1880.

*To all whom it may concern:*

Be it known that I, CHARLES A. SMITH, of the city of Toledo, in the county of Lucas and State of Ohio, have invented a new and useful Improvement in Railroad Stock-Cars, of which the following is a specification.

My invention relates to an improvement in stock-cars, the object being to provide a car which may be used to carry cattle or horses, or may be readily transformed into a car with two floors, suitable for transporting sheep or hogs.

Heretofore cars of this character have been provided with a double floor, the upper one having screws connected therewith, said screws extending down through the bottom of the car. Such cars were defective for the following reasons: The screws thus arranged necessitated a frame-work support within the car, which latter occupied valuable space, and was therefore objectionable. Further, the screws being located beneath the car allowed the filth and water to flow in direct contact with the screws and nuts connected therewith, thereby corroding such parts, and also allowing water to freeze around the nuts and prevent the ready operation of the screws. Again, in such construction of cars, both light and heavy stock must be supported on the upper floor, and hence the latter, if of light material, is soon worn away, and if heavy materially adds to the weight of the car, also to the labor of adjustment, and again imposes an unnecessary pressure upon the supporting-screws.

Also, I am aware that stock-cars have been provided with a double floor, the upper floor being suspended from the roof or top of the car by ropes attached to a shaft journaled in the top of the car. These cars were defective, owing to the fact that the ropes deteriorate and become weakened upon exposure to the weather, and being subjected to the varying strains will sometimes break, thereby causing great loss to the shipper. Hence I would have it understood that I make no broad claim to a stock-car provided with an adjustable floor and screws for retaining the floor in any desired adjustment. Neither do I make any broad claim to a car in which the upper floor is suspended from the top or car-roof.

The object of my invention is to obviate the defects above noted; and to that end my invention consists in the combination, with a stock-car, of an adjustable floor and adjusting-screws secured to the roof of the car, the lower ends of said screws being connected with the adjustable floor.

Figure 1:
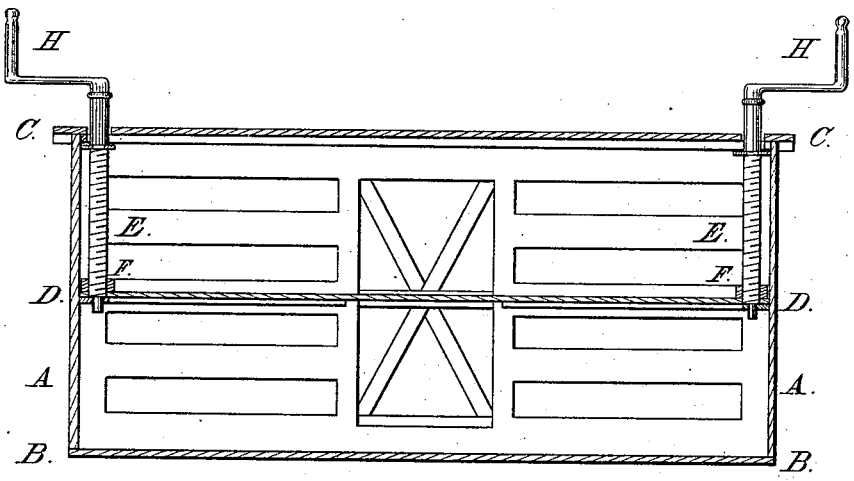
Figure 2:
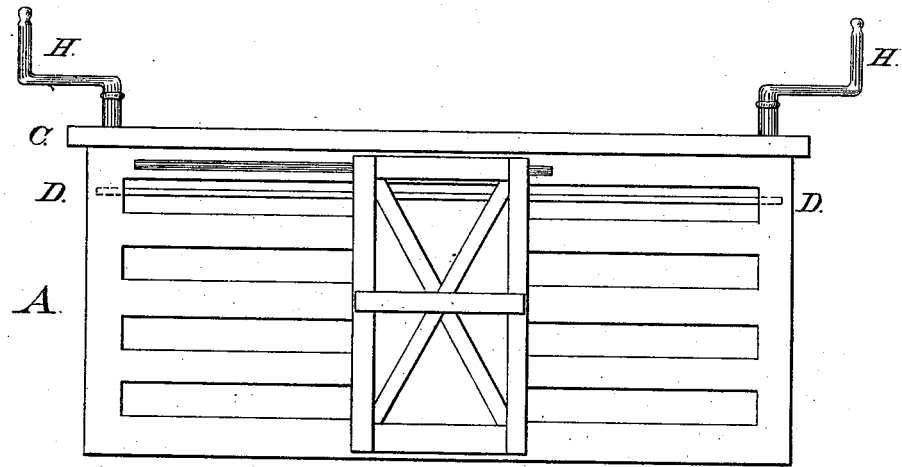

In the accompanying drawings, Figure 1 is a vertical section of a stock-car embodying my invention, and Fig. 2 is a side elevation of the same.

A represents the box of an ordinary stock-car, provided with the bottom or main floor, B, and with the roof C.

Within box A is located an upper or adjustable floor, D, which latter is provided at its opposite ends with nuts F F, with which engage the screws E E, the latter being inserted through the roof or top of the car and provided with handles H H for their operation.

When it is desired to use the car for transporting cattle, horses, or ordinary merchandise, the upper floor, D, is drawn up snugly beneath the top or roof of the car, and in this position is out of harm's way, provides an additional safeguard against the entrance of rain, and the nuts and screws for operating the floor are out of the way and kept clean and dry.

When it is desired to transform the car into a stock-car suitable for transporting sheep, &c., the upper floor is lowered to the proper point of adjustment, thus furnishing two floors to the car. The upper floor may be made comparatively light, as its only office is to sustain the weight and wear of the small stock transported thereon.

Having fully described my invention, what I claim as new, and desire to secure by Letters Patent, is—

The combination, with a box-car, of an adjustable upper floor and screws connecting with opposite ends thereof and extending upward through the car roof or top, whereby the upper floor, when not in use, may be drawn up against the car-roof, substantially as set forth.

CHARLES A. SMITH.

Witnesses:
 CHRISTIAN F. FRANCE,
 HENRY P. FOLSOM.